United States Patent [19]
McAlpine

[11] Patent Number: 6,011,798
[45] Date of Patent: Jan. 4, 2000

[54] ADAPTIVE TRANSMIT RATE CONTROL SCHEDULER

[75] Inventor: Gary McAlpine, Beaverton, Oreg.

[73] Assignee: Intel Corporation, Santa Clara, Calif.

[21] Appl. No.: 08/912,260

[22] Filed: Aug. 15, 1997

[51] Int. Cl.[7] .............................. H04L 12/28; H04L 12/56
[52] U.S. Cl. ............................................ 370/395; 370/412
[58] Field of Search .................................... 370/395, 412,
370/252, 229, 230, 235, 428, 429, 231–234;
395/200.43, 200.44, 200.64, 200.65

[56] References Cited

U.S. PATENT DOCUMENTS

| | | | |
|---|---|---|---|
| 5,050,161 | 9/1991 | Golestani | 370/412 |
| 5,268,900 | 12/1993 | Hluchyj et al. | 370/412 |
| 5,422,888 | 6/1995 | Wienkop | 370/94.1 |
| 5,515,363 | 5/1996 | Ben-Nun et al. | 340/825.51 |
| 5,533,020 | 7/1996 | Byrn et al. | 370/412 |
| 5,649,110 | 7/1997 | Ben-Nun et al. | 395/200 |

*Primary Examiner*—Ajit Patel
*Attorney, Agent, or Firm*—Kenyon & Kenyon

[57] ABSTRACT

An adaptive rate control scheduler multiplexes virtual circuit data stream elements for transmission onto a network from a network node. The rate control scheduler is an adaptive circuit that utilizes a schedule table (having multiple time windows) and a set of virtual circuit (VC) specific rate control parameters to supply a transmit controller with a stream of tokens (each of which represents an active VC). The order in which tokens are supplied to the transmit controller is based upon their respective time slot locations in the schedule table. Each time a token is processed by the transmit scheduler, a target time for the next processing of the VC represented by the token is calculated, based upon the stored VC-specific parameters. The token is then inserted into the schedule table in the nearest available time slot to the calculated target time. Included in the calculation of the next target time for a particular token is a gain function based upon an accumulated error value for the associated VC. The accumulated error represents error introduced into the VC's data stream by the scheduling process.

27 Claims, 17 Drawing Sheets

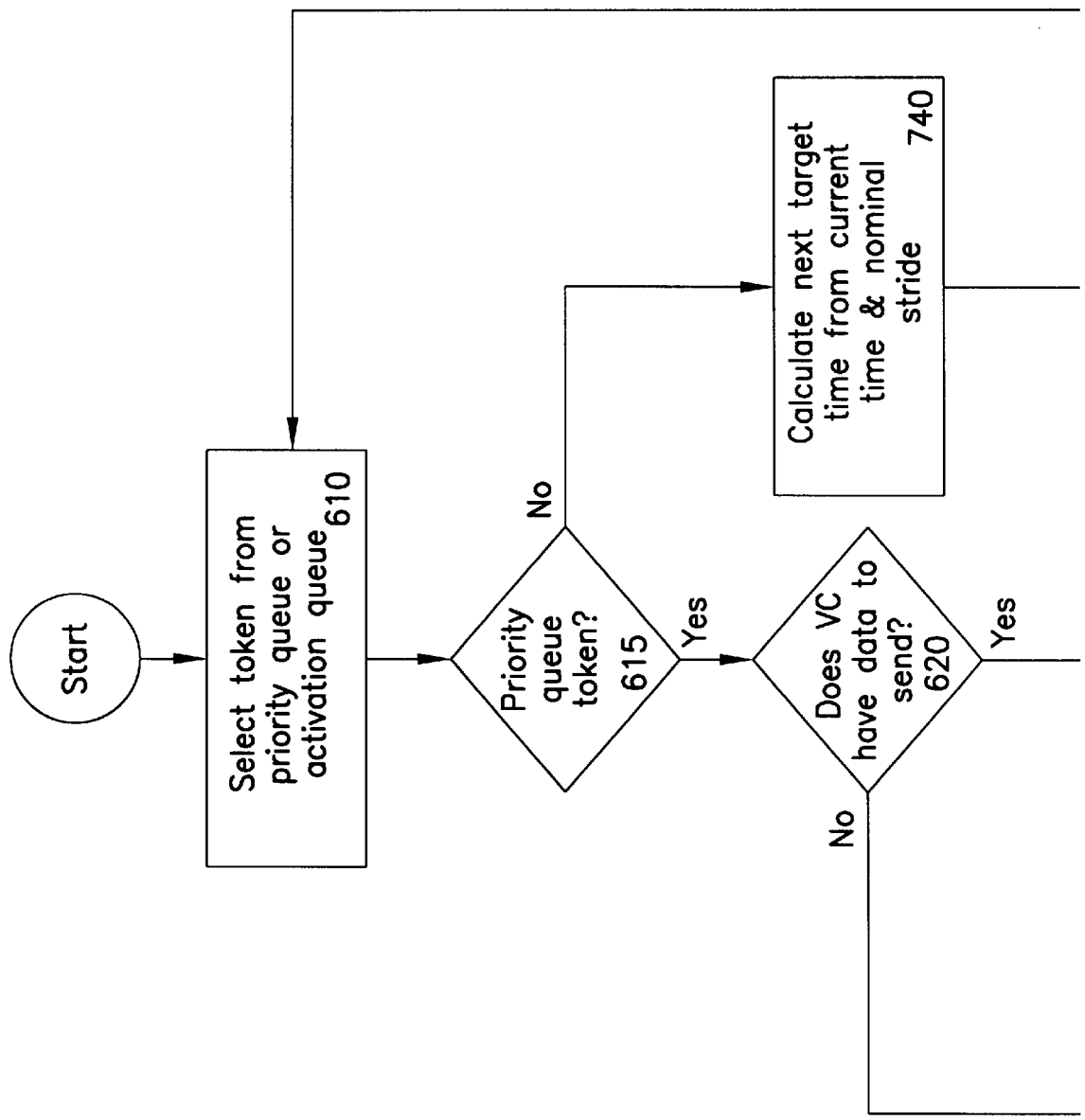
Fig. 7A.1

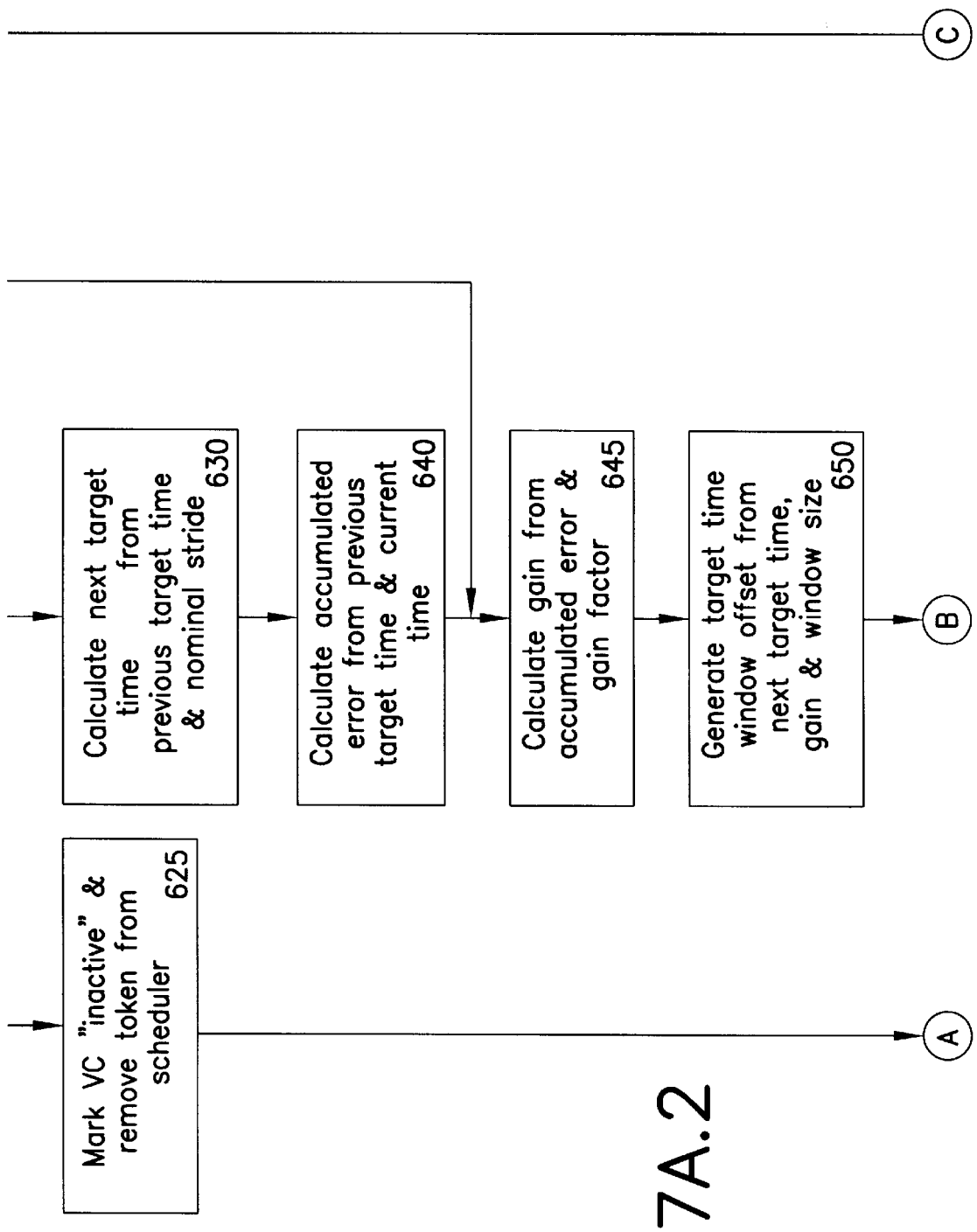
Fig. 7A.2

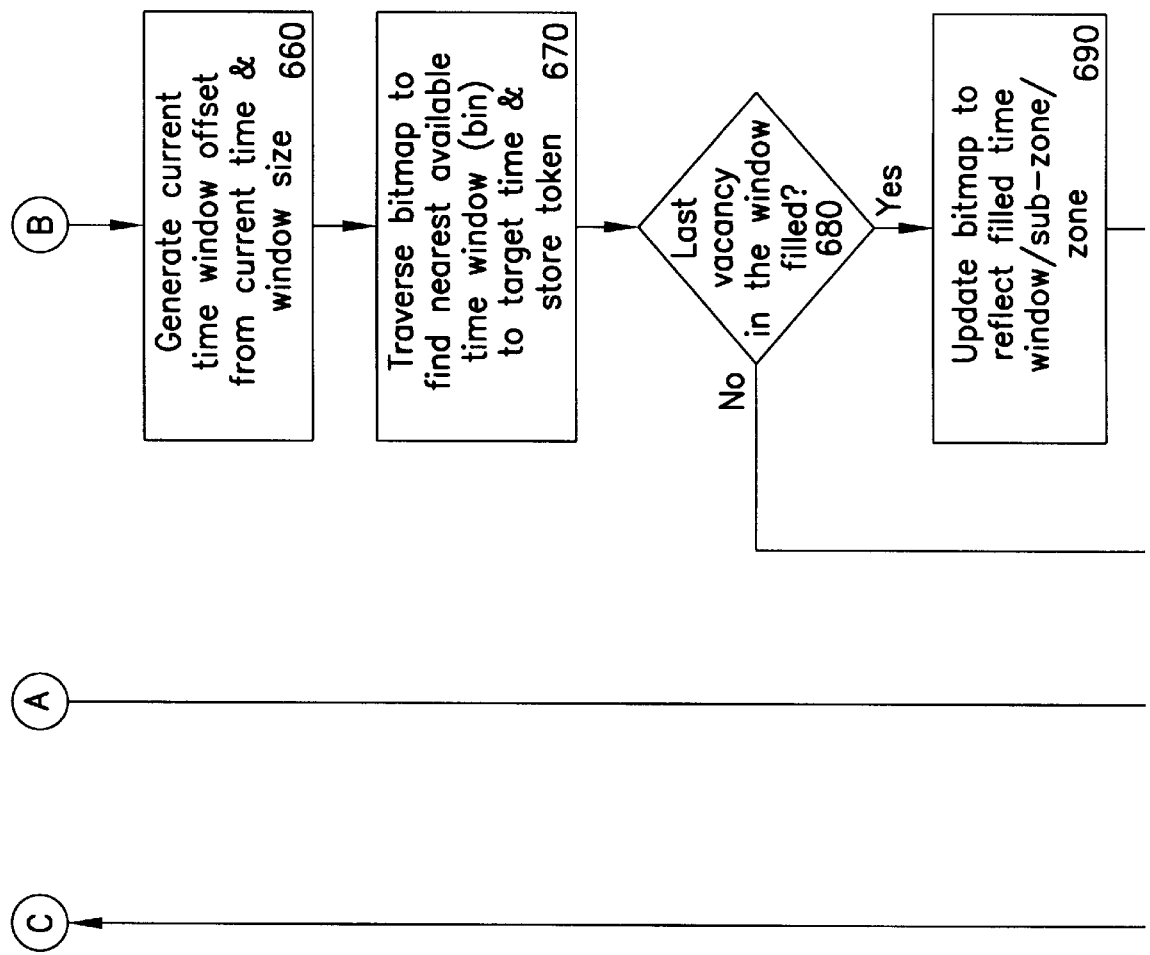
Fig. 7B.1

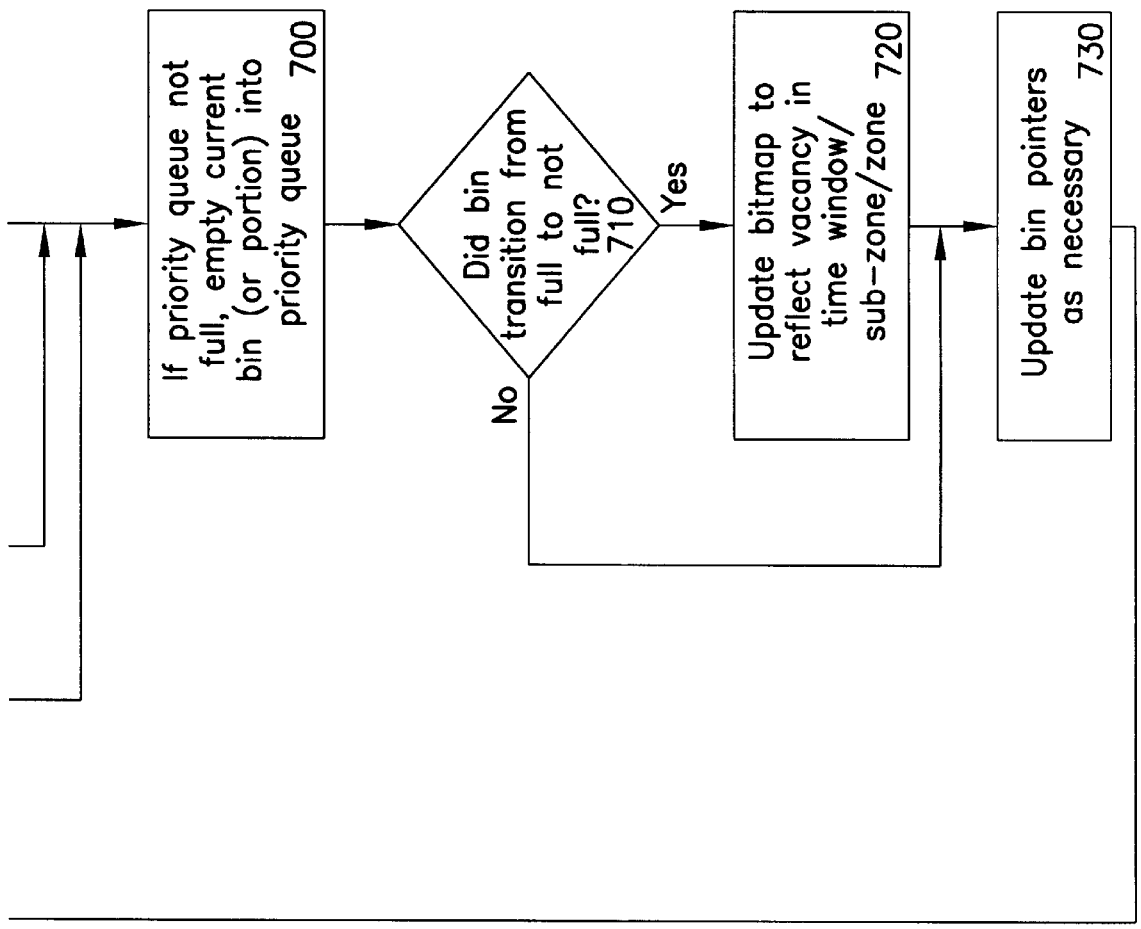
Fig. 7B.2

ADAPTIVE TRANSMIT RATE CONTROL SCHEDULER

BACKGROUND OF THE INVENTION

In a communication network node, a network interface controller (NIC) is employed to multiplex incoming and outgoing data stream elements (such as, e.g., packets or cells) associated with multiple communication channels (or "virtual circuits" (VCs)) established within a communication link. For outgoing data elements, the NIC requires a mechanism for arbitrating between the channels and determining the order in which their associated data stream elements are to be transmitted into the network. This arbitration mechanism must take into account various characteristics related to the channels, including, e.g., the service classes of the various data streams and any associated quality of service (QOS) requirements.

The service classes include, e.g., (in decreasing order of priority): Constant Bit Rate (CBR) for real-time data sampled at constant intervals (i.e., data having a constant frame size and a constant "stride" between frames), Real-time Variable Bit Rate (RT_VBR) for real-time data that varies in rate and tolerates more jitter (i.e., real-time data having a variable frame size and a constant stride between frames), Non-real-time Variable Bit Rate (N_VBR) for data that can tolerate more relaxed timing but requires reserved bandwidth (i.e., non-real-time data having a variable frame size and a variable stride between frames), Available Bit Rate (ABR) for non-real-time flow controlled bursty computer data traffic (i.e., non-real-time data having a variable frame size and a variable stride between frames which utilizes bandwidth (up to a specified maximum) not used by higher priority data traffic), and Unspecified Bit Rate (UBR) for non-flow controlled computer traffic with only a best effort delivery requirement (i.e., non-real-time data having a variable frame size and no guaranteed stride between frames, which utilizes bandwidth not used by higher priority traffic, up to the maximum communication link bandwidth). QOSs are determined by such variables as the minimum and maximum transmission rate, maximum variation in data element spacing, maximum burst length, etc.

With the continued integration by computer applications of more and more multimedia communication with the traditional file transfers, network attached input/output (I/O), and intra-cluster communication, there is increasing pressure on network components to handle simultaneously a large number of data streams having a wide variety of QOSs. In addition, where the speed (or bandwidth) of components varies within a given data path through a network, the traffic being transmitted from the faster components may need to be throttled to prevent jamming of the slower components with more data traffic than they can handle.

The network component most responsible for maintaining the QOSs, transmission rates, etc. of the various communication streams exiting a node is the "transmit side" of the NIC. On the NIC's transmit side, a transmit scheduling mechanism (or "scheduler") is needed which can meter simultaneously a large number of data streams into a network such that the QOS specified for each stream can be maintained end-to-end by the network.

The most common transmit schedulers employed in recent communication networks are rate queues. There are a variety of rate queue implementations, most of which are found in asynchronous transfer mode (ATM) NICs. Rate queues range from very simple circuits that can handle only a few streams simultaneously to fairly complex circuits that can manage thousands of channels (or VCs) simultaneously, with a maximum of a few hundred active at any given time.

A rate queue is typically implemented as a free-running circular buffer or re-circulating FIFO (first-in-first-out), wherein each location in the queue represents a fixed-size time slot. A channel is assigned to a particular time slot through the insertion of the appropriate channel number into the slot. The total number of time slots in a queue can be varied to alter the frequency in which each queue entry is accessed. The number of queue entries assigned a particular channel can be varied to alter the number of data elements transmitted over the channel during one pass through the queue. In some rate queue implementations, the time represented by each time slot can be varied somewhat to alter the base rate and the total time represented by one pass through the queue.

There are a number of drawbacks to rate queues which make them inadequate for handling simultaneously a large number of communication channels with diverse characteristics. First, the granularity of rates available for streams are generally limited in rate queues to some function of the time it takes to transmit a fixed-size data element at the maximum rate of the NIC output. For instance, the time it takes to transmit an ATM cell over an OC-3 SONET link is about 2.8 microseconds. Many rate queues on ATM/OC-3 NICs can only produce transmission rates that are some function of an integral number of these 2.8 microsecond time slots. More sophisticated rate queues can produce transmission rates that are some harmonic of the NIC clock cycle time, but even this granularity may be inadequate for the mix of communication streams in some networks.

A second drawback to rate queues is that they can generally handle only a few different transmission base rates simultaneously, with each base rate assigned to a different rate queue. All transmission rates must then be some function of these few base rates. Because each rate queue requires a separate set of data storage locations and separate control logic, the total number of queues (and thus the total number of base rates) implemented by a particular NIC is limited by the practicalities of the hardware requirements. In addition, if a given rate queue were implemented to handle the large number of voice channels (with slow transmission rates and minimal bandwidth requirements) that potentially could be active simultaneously on a given high speed network link, a large amount of hardware would be required, even though much of it would likely be wasted most of the time.

Yet another drawback to rate queues is that they can handle only a limited mixture of traffic types (transmission rates, QOSs, etc.), due to the fixed nature of the characteristics of each queue. The simultaneous management of rate queues entries for a wide variety of traffic types with diverse QOSs over a large number of channels is difficult to do in a way that ensures the link bandwidth is used efficiently and the QOSs are maintained.

An alternative to rate queues for transmit scheduling is described in U.S. Pat. No. 5,579,302, issued Nov. 26, 1996 to Banks (the "'302 patent"). However, the "guaranteed bandwidth scheduler" of the '302 patent is designed specifically for data traffic having a constant frame size and a constant stride (e.g., CBR data), such as is used in asynchronous transfer mode (ATM) network applications. Because the data transmission scheduling calculations for a particular VC, according to the '302 patent, are performed based upon constant frame sizes and strides, the worst case bandwidth requirement (i.e., the maximum frame size and frame stride) must be assumed when scheduling non-CBR (such as, e.g., Ethernet) data traffic. Thus, if the average data frame size and/or stride for a particular VC are lower than the maximum possible for that VC, bandwidth may be wasted.

A further drawback of the scheduler of the '302 patent is the lack of a predetermined set of steps (i.e., a predetermined time period) for the scheduling of the next data transmission for a particular VC. It is possible that a scheduler, in attempting to select a time slot for the next data transmission for a particular VC, will find that the time slot has already been assigned to another VC. Thus, a conflict resolution mechanism, which attempts to find an alternative time slot for one of the conflicting VCs, may be employed. Conflict resolution according to the '302 patent scheduler is an unbounded iterative process, which could potentially cause significant delays in scheduling or even an unrecoverable loss of time, and thus introduce a high amount of error into one or more of the VC data streams. The likelihood of conflicts between VCs being scheduled and, thus, the likelihood of the introduction of significant delays or the unrecoverable loss of time, can be reduced in the '302 patent scheduler by minimization of the number of possible simultaneously active VCs allowed in relation to the number of total possible transmission time slots. This leads, however, to underutilization of the available time slots, and thus an inefficient use of the available bandwidth.

SUMMARY OF THE INVENTION

According to an embodiment of the present invention, a rate controlled scheduling method is provided in a network node having a transmit controller and a schedule table having a plurality of time windows. Each time window includes at least one token slot and a priority queue containing at least one token, where each token represents an active virtual circuit (VC). In this method a first token is selected from the priority queue, and a copy of it is sent to the transmit controller for servicing of the VC represented by the first token. A next target time for servicing of the VC represented by the first token is then calculated. The first token is then stored in the schedule table in a time window near the calculated next target time. Subsequent tokens from the schedule table are then transferred to the priority queue.

BRIEF DESCRIPTION OF THE DRAWINGS

FIGS. 7A and 7B are flowcharts which depict the token processing steps performed in one embodiment of an adaptive rate control scheduler according to the present invention.

DETAILED DESCRIPTION

Figure 1:
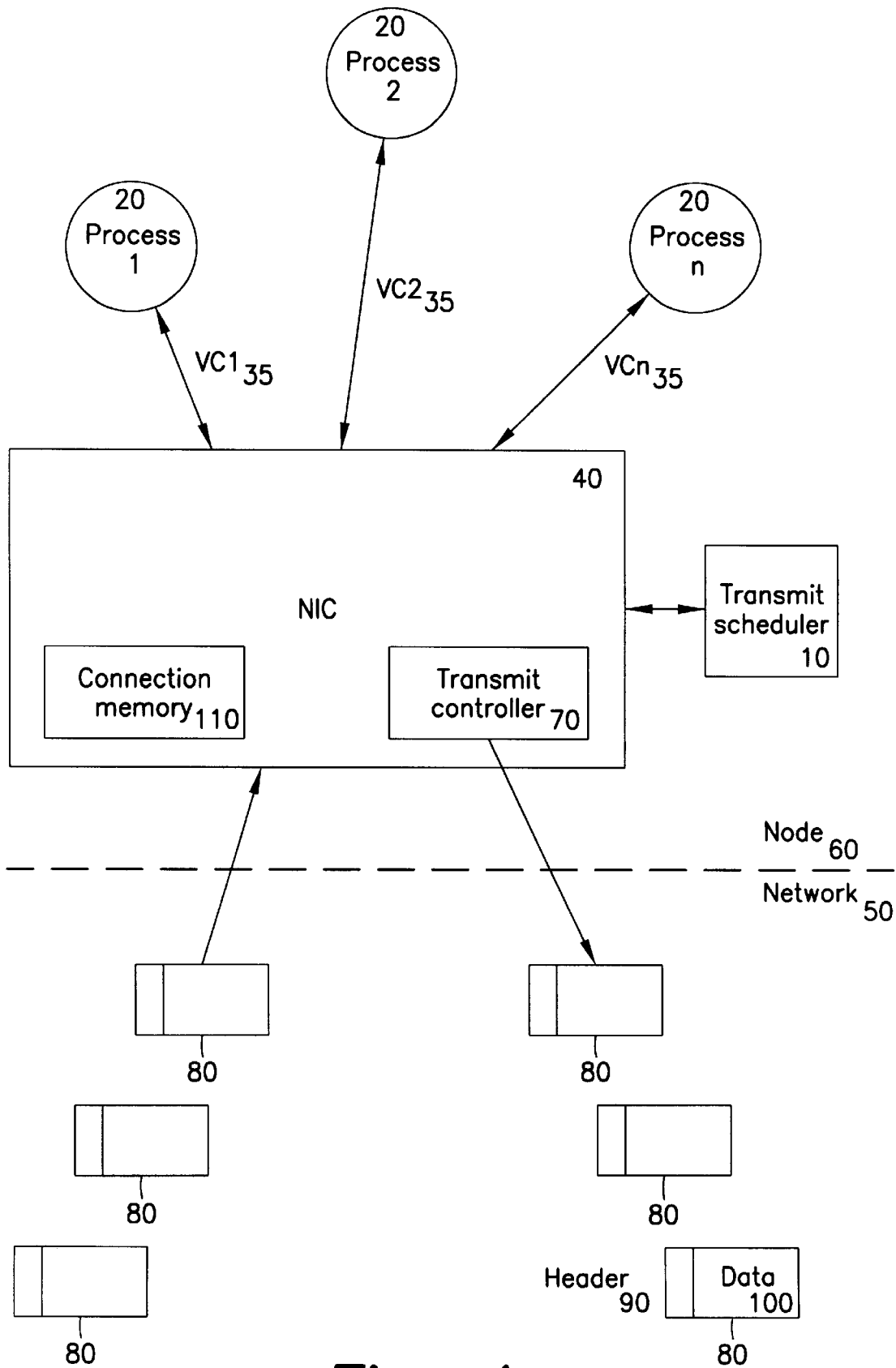
FIG. 1 depicts a network node employing a transmit scheduler for scheduling the transmission of data elements into a network according to one embodiment of the present invention.

FIG. 1 depicts a network node 60 employing a transmit scheduler 10 for scheduling the transmission of data elements 80 into a network 50 according to one embodiment of the present invention. At any given time within the node 60, there may be many active virtual circuits (VCs) 35, each of which provides a communication path between a process 20 on the node 60 and a corresponding process running on a separate node, via a network 50. A network interface controller (NIC) 40 multiplexes the incoming and outgoing data stream elements 80 associated with the virtual circuits 35. Each data stream element includes data 100 and a header 90, and can be, for example, an asynchronous transfer mode (ATM) cell, or a variable-sized Ethernet data packet.

The transmit scheduler 10 according to the illustrated embodiment of the present invention includes a rate control scheduler 15 for scheduling rate controlled VCs (i.e., those having, e.g., CBR, RT_VBR, N_VBR and ABR QOSs), and a Best effort scheduler 1200 for scheduling VCs having a UBR QOS. Operation of the Best effort scheduler 1200 and the rate control scheduler 15 is discussed further below, in conjunction with FIG. 4. The primary focus, however, of the present discussion is the operation of the rate control scheduler 15.

The rate control scheduler 15 calculates a target time for the transmission of data from various VCs 35 based upon VC-specific data stored, e.g., in connection memory 110 in the NIC 40. Transmission of outgoing data frames from the various active VCs is then triggered by the provision by the rate control scheduler 15 of a stream of VC numbers ("tokens") to the NIC's transmit controller 70. In response to each received token, the transmit controller 70 retrieves from memory a data frame (comprised of one or more data stream elements) corresponding to the VC indicated by the token, and transmits the data into the network 50.

Figure 2:
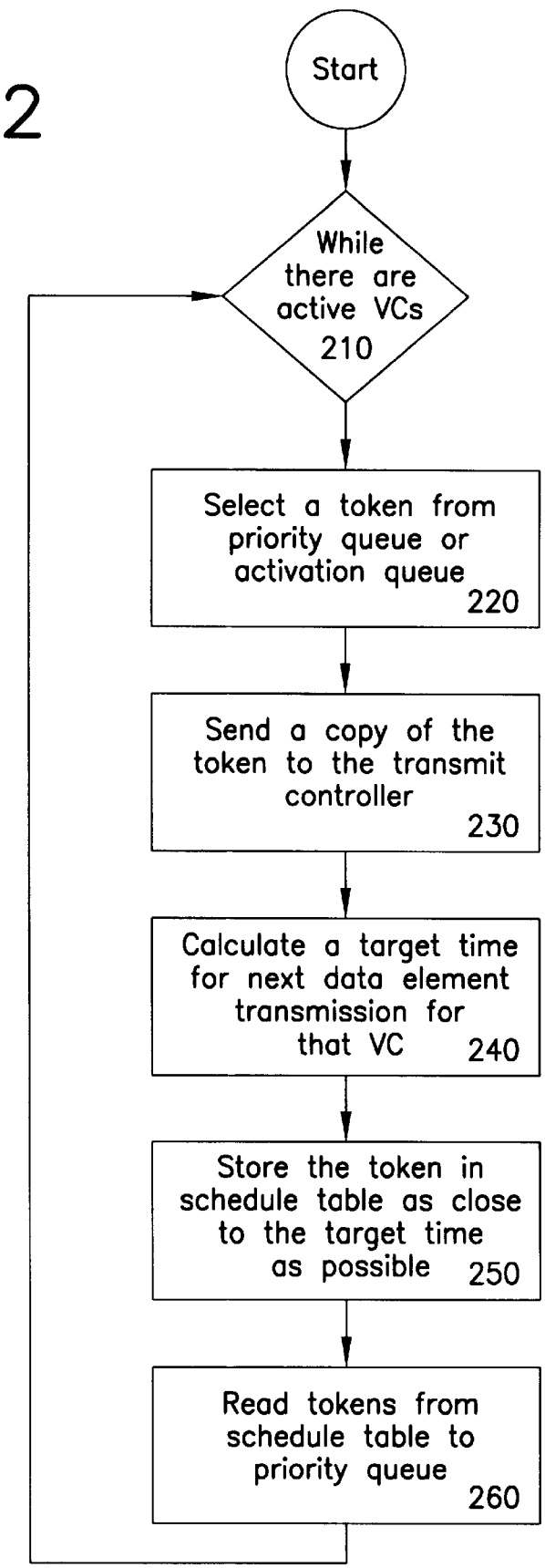
FIG. 2 is a flowchart depicting the functions performed by an adaptive rate control scheduler according to one embodiment of the present invention.

FIG. 2 is a flowchart depicting the functions performed by an adaptive rate control scheduler 15 according to one embodiment of the present invention. While there are active rate controlled VCs in the node (i.e., while there is one or more rate controlled VCs with data to send) (step 210), the rate control scheduler 15 selects a VC token from a priority queue (step 220). The rate control scheduler 15 sends a copy of the token to the NIC's transmit controller 70 (step 230), which, in turn, transmits one or more data elements corresponding to the appropriate VC 35 into the network 50. The rate control scheduler 15 then processes the token, calculating a target time for the transmission of the next data element 80 for the VC 35 represented by the token (step 240). Once the next transmission target time is calculated, the rate control scheduler 15 stores the token in a schedule table time slot as close to the calculated target time as possible (step 250). The rate control scheduler 15 then extracts zero or more tokens from the schedule table and places them into the priority queue (step 260). This series of steps is repeated while there are active rate controlled VCs 35 in the node—i.e., while the node has outgoing rate controlled data elements 80 to be transmitted.

Operation of the priority queue is discussed further below, in conjunction with FIG. 11. It should be noted that the priority queue is not necessarily a FIFO—i.e., the priority queue may re-order tokens according to, e.g., priority and target data transmission time. Any desired prioritization algorithm can be employed to determine the order in which tokens are serviced from the priority queue. In general, however, the placement of a token into the schedule table provides a "coarse approximation" of the next target time slot and the prioritization algorithm employed by the priority queue provides "fine tuning" for the scheduling of VC data transmissions.

Figure 3:
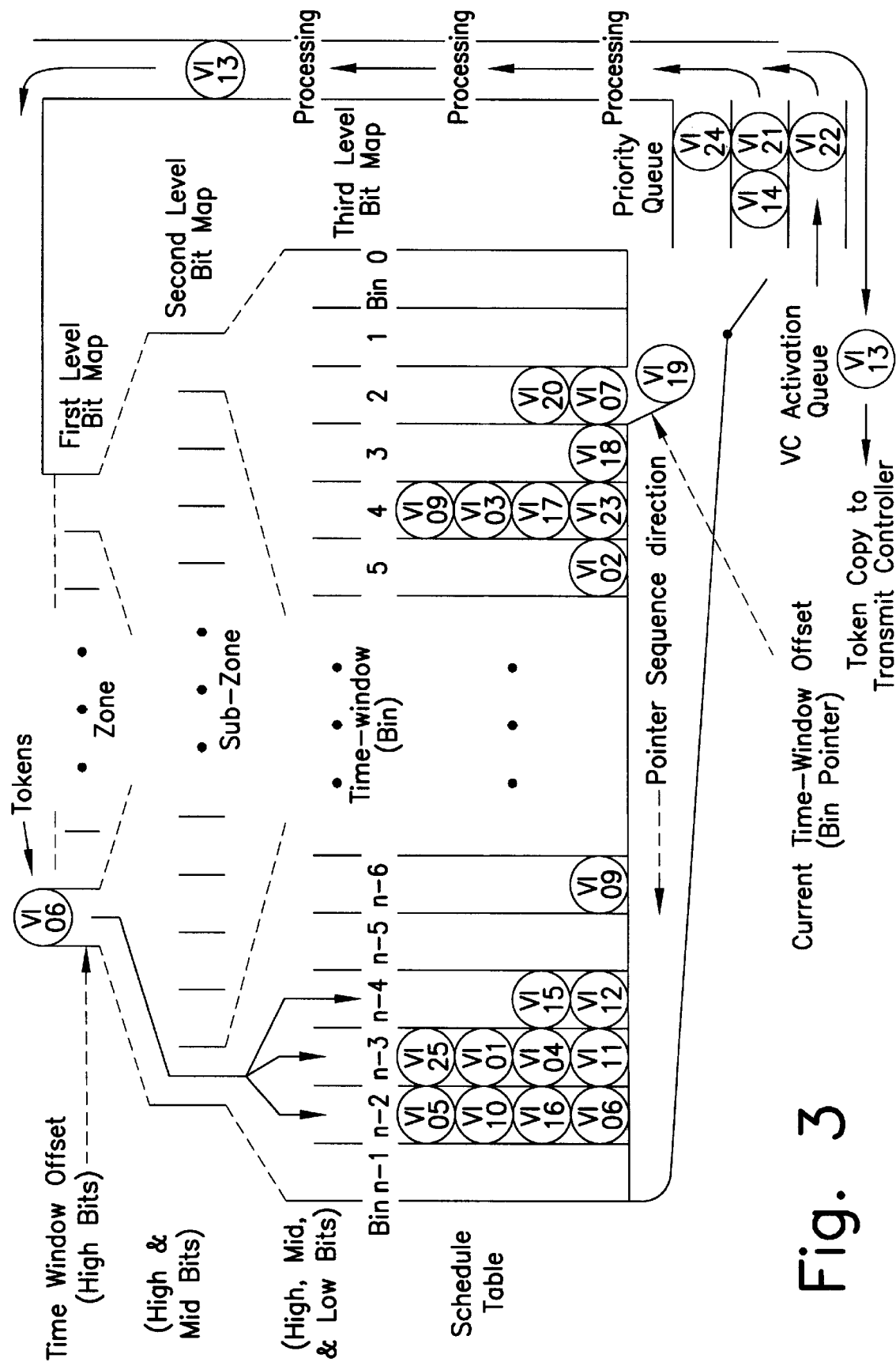
FIG. 3 depicts a functional analogue for the operation of an adaptive rate control scheduler according to one embodiment of the present invention.

FIG. 3 depicts a functional analogue for the operation of an adaptive rate control scheduler 15 according to one embodiment of the present invention. Operation of the present adaptive rate control scheduler 15 is analogous to that of a Japanese Pachinko machine. The schedule table in which the rate control scheduler 15 stores tokens in accordance with their calculated data element transmission times is comprised of a series of bins (or "time windows"), wherein each time window includes a plurality of token slots. Each token slot represents an approximate time period during which one token is expected to be processed by the rate control scheduler 15 and, consequently, one or more data elements 80 from the appropriate VC 35 are expected to be transmitted into the network 50 by the transmit controller 70. Each time window is thus able to hold a plurality of tokens, each token slot representing an approximate transmission time in the particular schedule table configuration.

According to an embodiment of the present invention, a conflict resolution method is performed within a predetermined set of steps when a target time window is already filled. A multi-level bit map is employed by the rate control scheduler 15 to quickly locate an available time window that is near the calculated target time for a particular token. Preferably, the nearest available time window to the one in which the calculated target time is located. In one embodiment of the present invention, a single token for each active VC 35 is circulated through the rate control scheduler 15. Upon initial activation of a VC 35, or upon reactivation of a VC 35 after a period of inactivity, a token representing the VC "enters" the rate control scheduler 15 via a VC activation queue. Once inside the transmit scheduler "Pachinko machine," tokens continue to circulate until the time at which the VC 35 represented by a particular token becomes inactive (i.e., no longer has data to send).

As discussed above in reference to FIG. 2, the data transmission scheduling process according to one embodiment of the present invention begins when a VC token is selected from a priority queue or VC activation queue. A copy of the selected token is sent by the rate control scheduler 15 to the transmit controller 70, triggering the transmit controller 70 to service the VC 35 represented by the token. The original token is processed by the rate control scheduler 15 to determine the next target time for servicing of the associated VC 35. Based upon the calculated target time value, a target bin (or "target time window") for the token is generated. Next target time and target bin calculations are based upon VC-specific parameters stored, e.g., in a context table in connection memory 110 in the NIC 40 and/or received from the network 50 or the sending process 20.

After a target bin for the token is generated, the token is "dropped" into the top of the Pachinko machine, where it is "guided" to the nearest available bin to its calculated target bin. Guidance of the tokens through the Pachinko machine is performed through the use of the target bin value and a multi-level bitmap, wherein each level of the bitmap represents one level in the Pachinko machine hierarchy. Each bit in the bitmap provides status information regarding one or more of the bins in the Pachinko machine. Setting of a bit (i.e., to a "set" state) in the third level of the bitmap indicates that a particular bin is full, setting of a bit in the second level of the bitmap indicates that a group of bins (or a "sub-zone") is full, setting of a bit in the first level of the bitmap indicates that a group of sub-zones (or a "zone") is full. When the target bin for a particular token is full, the bitmap will guide the token to the nearest available alternative bin. When the entire sub-zone containing the target bin for a particular token is full, the bitmap will guide the token to the nearest available alternative sub-zone and bin. When the entire zone containing the target bin is full, the bitmap will guide the token to the nearest available alternative zone.

Each bin in the "Pachinko machine" corresponds to a time window entry in the schedule table of the rate control scheduler 15 according to the illustrated embodiment of the present invention. Choice of the number of levels in the Pachinko machine (and thus in the bitmap) is made based upon the total number of bins (or time windows) desired. This, in turn, is based upon such factors as the expected number of simultaneously active VCs 35, the minimum and maximum allowed transmit rates, etc.

According to the illustrated embodiment of the present invention, the rate control scheduler 15 uses a current time window offset (or "bin pointer") to sequentially step through all the bins in the Pachinko machine, in a sequential circular fashion. The bin pointer acts as the master clock for the rate control scheduler 15. When the current time window pointer reaches a particular bin, the "trap door" in the bottom of the bin is opened, and the tokens contained therein are allowed to flow into the priority queue. Each time the token of an active VC falls through the trap door, it is prioritized (i.e., "fine tuned") through the prioritization scheme of the priority queue. When the token reaches the head of the priority queue, a copy of the token is sent to the transmit controller 70, and the token is then processed anew and dropped back into the Pachinko machine in a future time window (i.e., a bin some increment ahead of the bin pointer).

As the rate control scheduler 15 empties each bin, the bitmap is updated so that the appropriate bits are cleared (i.e., set to a "cleared" state) to indicate that a particular bin/sub-zone/zone are available for acceptance of further tokens. The bin thus becomes associated with a future time window. When bin n–1 is emptied, the bin pointer begins cycling through the bins anew, beginning with bin 0.

When a VC 35 is first activated, or is reactivated after a period of inactivity, a corresponding token is inserted into the VC activation queue. The next time the priority queue goes empty or a token having a lower priority than the token in the VC activation queue reaches the head of the priority queue, a copy of the token in the VC activation queue is sent to the transmit controller 70. The token is then processed and dropped into the top of the Pachinko machine, where it will continue to cycle through until the VC 35 once again becomes inactive. Because tokens are processed in parallel by the rate control scheduler 15 and the transmit controller 70, tokens are left in the scheduler's "Pachinko machine" for one extra iteration after their associated VCs 35 run out of data to send. In this way, if new data for the VC 35 becomes available before the token is next read from the priority queue, the token will continue to cycle. If no data is available to send when the token is next read by the rate control scheduler 15 from the priority queue, the VC status is updated to "inactive" and its corresponding token is removed from the rate control scheduler 15. Leaving the token in the rate control scheduler 15 for one extra iteration ensures that the data transfer rate for the VC 35 will not exceed the desired rate (as determined from the parameters stored in the VC's context information) in those circumstances where the VC runs out of data to transmit and then gets new data in less than the specified stride between token slots for that VC.

Real-time VCs 35 with the QOS requirement to maintain a constant data frame rate (e.g., CBR or RT_VBR VCs) must always have data ready to send when their corresponding tokens are sent to the NIC's transmit controller 70, if the requisite QOS is to be maintained. This means the process supplying the outgoing data must always stay ahead of the rate control scheduler 15. If a CBR or RT_VBR stream is "starved" from time to time, it will operate at something less than the specified bit rate.

N_VBR and rate controlled ABR streams may operate much like real-time streams that get starved in varying degrees, or their rates may be varied dynamically. In one embodiment of the present invention, VCs 35 of these types are programmed for the maximum data rate required to allow them to maintain the desired average rate, given the characteristics of the data source. In an alternative embodiment of the present invention, N_VBR stream data rates are explicitly varied with rate control inputs supplied by the sending process 20, and ABR stream data rates are varied according to flow control feedback data from the network 50.

The Pachinko machine depicted in FIG. 3 contains three levels, each corresponding to one level of a bitmap. Each bin in the third level of the illustrated Pachinko machine is capable of storing four VC tokens. The shaded areas in the illustrated Pachinko machine correspond to zones, sub-zones, and bins that are full (and for which the corresponding bits in the three-level bitmap are thus set). In the illustrated example, the target bin for the token corresponding to VC number 06 is bin n–3. The token is thus dropped into the first level of the Pachinko machine in the zone which includes bin n–3. The token is then guided to the sub-zone which includes bin n–3. Because, in the illustrated example, bin n–3 is full and a first alternative bin (bin n–2) is also full, the token is placed in bin n–4, the nearest non-filled alternative bin to bin n–3.

Figure 4A:
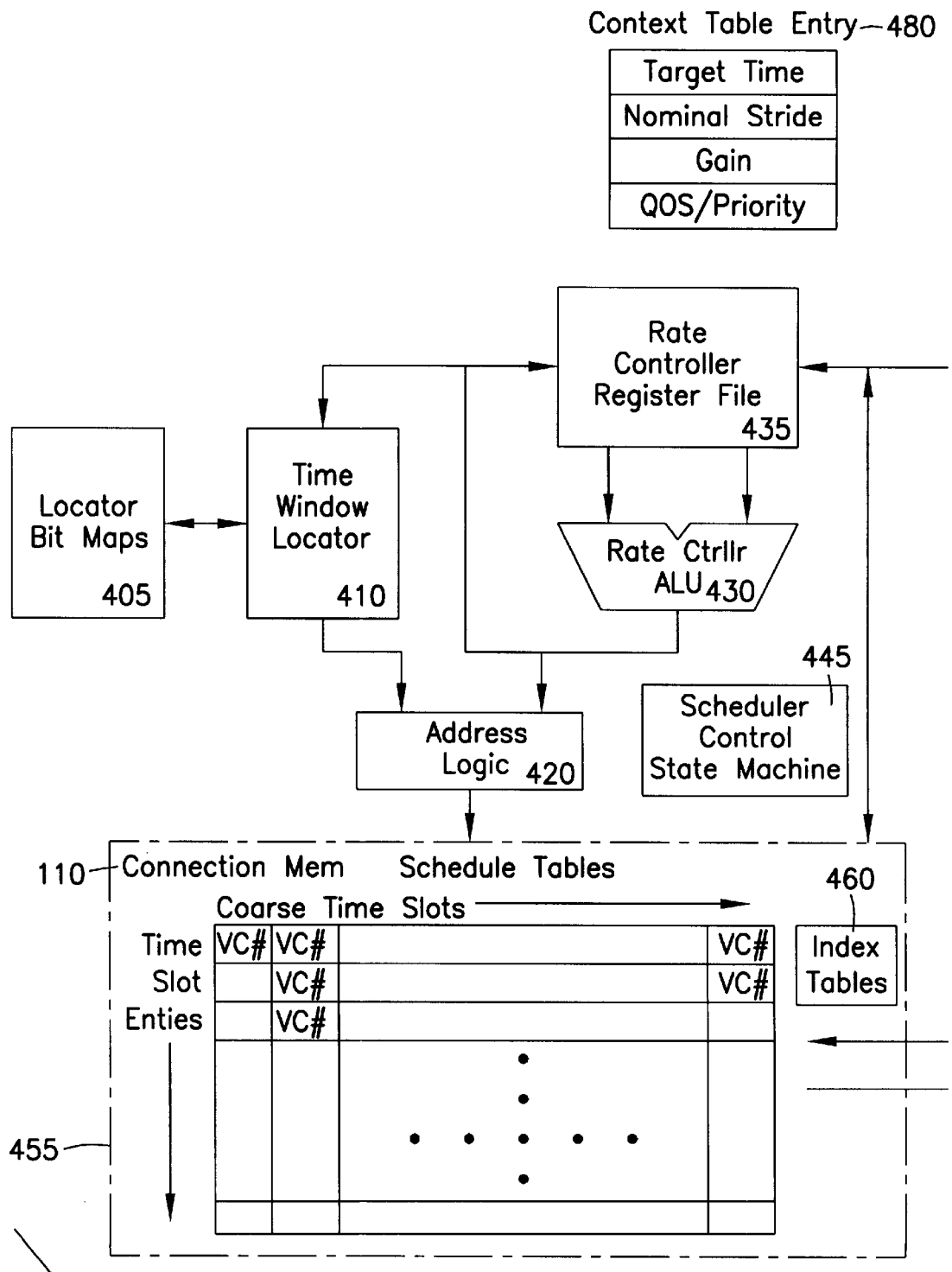
FIG. 4 depicts a functional block diagram of an adaptive rate control scheduler according to one embodiment of the present invention.
Figure 4B:
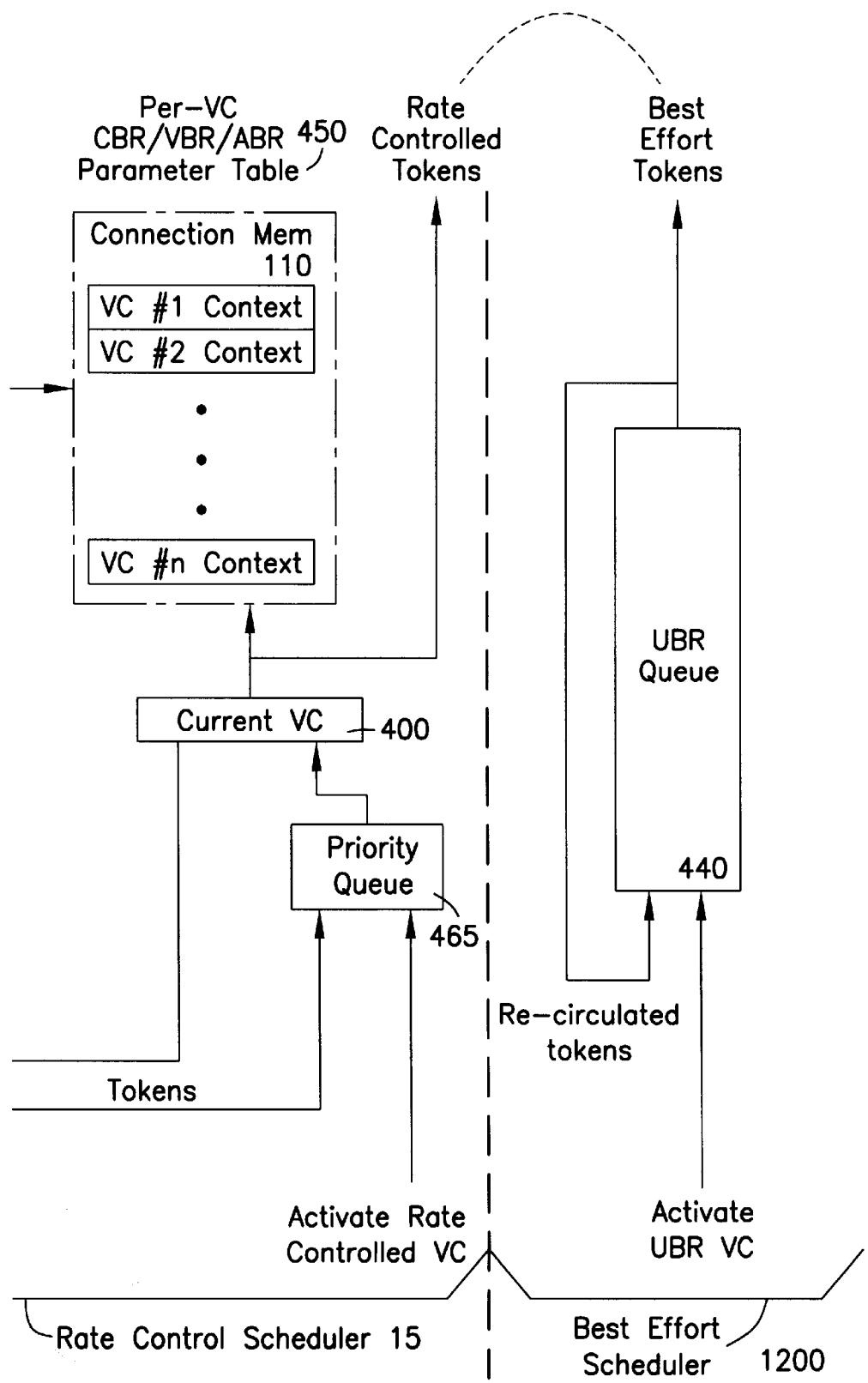

FIG. 4 depicts a functional block diagram of an adaptive rate control scheduler 15 according to one embodiment of the present invention. When a VC token is selected from the head of the priority queue 465, it is designated the current VC 400. A copy of the current VC token is sent to the transmit controller 70, which in turn services the VC 35 represented by the token.

Various rate control related parameters corresponding to the current VC are stored in a parameter or context table 450 in the NIC's connection memory 110, and are used in calculating the appropriate target time window in the schedule table 455 for the token. In the illustrated embodiment of the present invention, the parameters stored in the context table entry 480 for each VC include: the calculated target time (in nanoseconds) for the next transmission of a data frame for the VC; the nominal stride (in nanoseconds) between data frames for the transmission rate specified for the VC (this value may vary for, e.g., N_VBR or ABR streams, but will remain constant for, e.g., CBR or RT_VBR streams); a gain factor which specifies the rate at which the scheduler 15 will compensate for accumulated error; and the QOS (or priority) type of the data stream.

A rate controller arithmetic logic unit (ALU) 430 is used to calculate the target time window from the stored VC specific parameters. Based upon this calculated target time window, a time window locator 410 checks the various levels of a bitmap 405 to determine the nearest available time window, with a token slot vacancy, to the target time window. Address logic 420 is then used to find the appropriate index in an index table 460 in connection memory 110, and this index is then used to insert the token into the schedule table 455 in the appropriate token slot.

Each time the rate control scheduler 15, according to the illustrated embodiment of the present invention, processes a token, it calculates the next target time window for servicing of the VC 35 represented by that token. Because there are likely to be many active rate controlled VCs 35—operating at a variety of different transmit rates—at any given time within the node, there may be times when tokens for many VCs 35 will have the same target time window. If there are more tokens targeting a particular time window than the time window is able to hold (e.g., if there are more than four tokens targeting a time window (or "bin") in the rate control scheduler 15 whose operation is illustrated in FIG. 3), then one or more of the tokens will have to be placed into an alternative time window. A certain amount of error is thus introduced into the data streams corresponding to those tokens. In fact, since a bin represents multiple token slots, and since the ordering of tokens may be rearranged within the scheduler's priority queue, it is unlikely a token will ever get serviced at exactly its target time.

Data stream error may also result from the fact that the illustrated rate control scheduler 15 is designed to operate on a master time window granularity, but data stream rates can be selected at the resolution of any reference clock period and each transmission time slice length (i.e., the amount of time it takes the transmit controller to transmit a given data frame over the network communication link) varies with the data frame size.

To compensate for the errors introduced into the various rate controlled data streams, the rate control scheduler 15 according to the illustrated embodiment of the present invention calculates the frame stride for each VC to the nearest nanosecond, and continuously tracks the accumulated error. The accurate stride calculations will automatically and continuously drive the accumulated error toward zero. A calculated accumulated error value is then used by a gain function to dampen the jitter in stride between cells or frames. Thus, although scheduling inherently introduces error into all rate controlled data streams, the present rate control scheduler 15 continuously compensates so as to minimize the jitter and accumulated error and to control the many different stream rates to within the tolerance of the NIC's reference clock.

Figure 5:
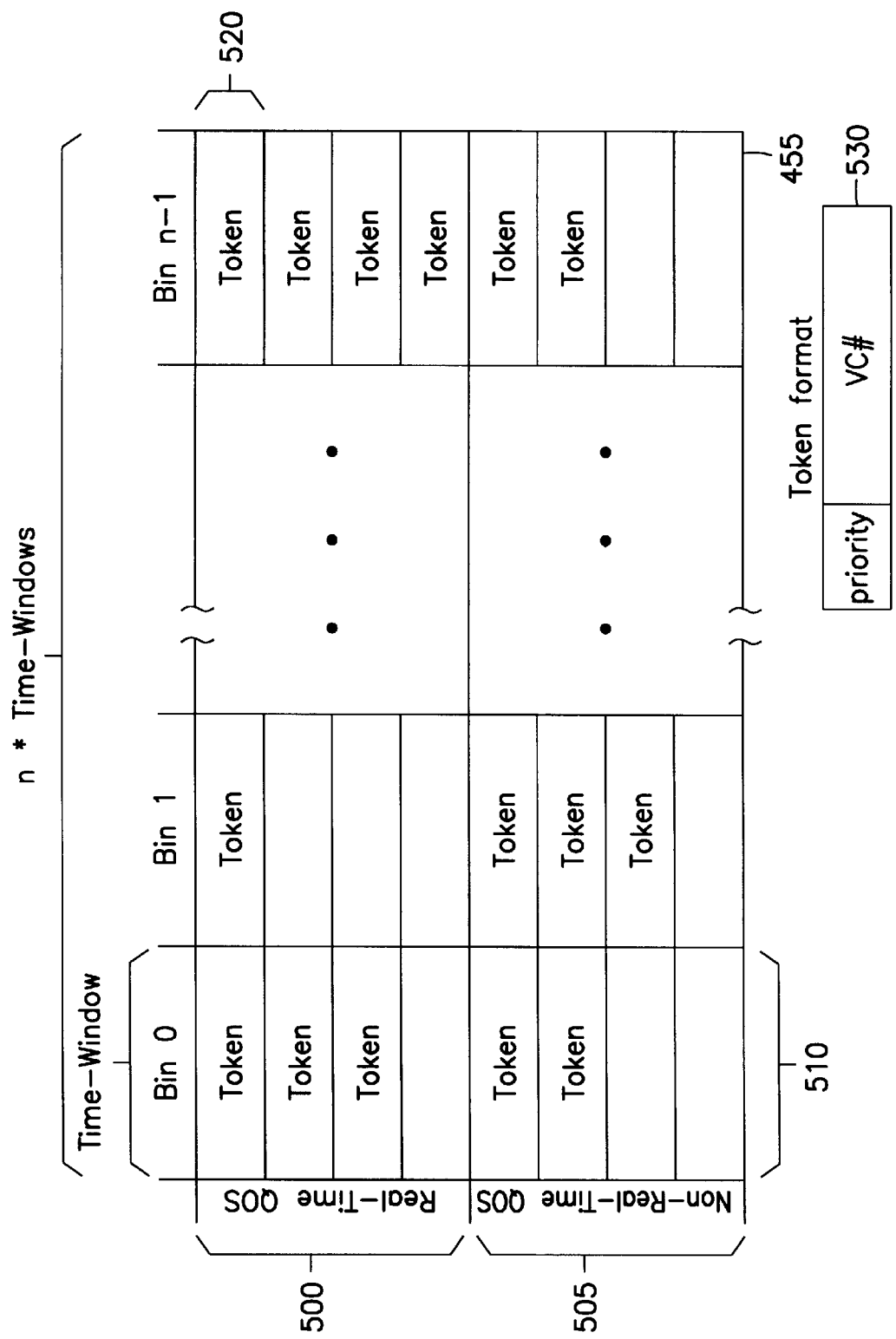
FIG. 5 depicts a schedule table configuration as employed in one embodiment of an adaptive rate control scheduler according to the present invention.

As indicated above, the rate control scheduler 15 uses a schedule table 455 stored, e.g., in connection memory 110 in the NIC 40, to keep track of the token assignments for each of some number of future time windows. FIG. 5 (discussed further below) depicts a schedule table 455 configuration as employed in one embodiment of the present invention. However, the configuration of the schedule table 455 employed by the present rate control scheduler 15 can vary. The size of the schedule table (i.e., the number of time windows and the maximum number of tokens that can be stored in a particular time window) is configurable. The schedule table can be configured, for example, upon initialization of the NIC 40.

In general, it will be preferable to configure the schedule table 455 so that it will be fairly sparsely populated with tokens at any given time. In embodiments such as that illustrated herein in which there is at any time at most one token per VC 35 "cycling through" the rate control scheduler 15, the total schedule matrix size should generally be multiple times the maximum number of simultaneously active VCs 35 supported by the node 60. Such a configuration will ensure that tokens are generally placed in or near their target time windows.

The number of time windows to be included in the schedule table 455 and the length of each time window are scalable, based on, e.g., the number of simultaneously active VCs 35 and the range of data transmit rates supported by a particular NIC 40 implementation. These parameters can be specified, e.g., at the time the NIC 40 is initialized, and the schedule table 455 can then be configured accordingly. In general, as the average data rate per active VC 35 increases in a particular system, the maximum number of VCs 35 that can be active simultaneously, decreases. The total number of time windows in a table 455 and the length of each time window determines the lowest data rate that can be selected for any given VC 35.

As discussed above, the transmit scheduler 10 according to the illustrated embodiment of the present invention includes a rate control scheduler 15 and a Best effort scheduler 1200 (for scheduling VCs having a UBR QOS). The Best effort scheduler 1200 uses a recirculating queue 440 to select VC tokens in a sequential circular order from a group of VCs setup for UBR QOS. When a VC becomes active (i.e., has data to send), a token corresponding to the VC is inserted into the UBR queue 440. Whenever the transmit controller 70 requests a token from the priority queue 465 of the rate control scheduler 15 and the priority queue 465 has none to offer, the transmit controller 70 may request a token from the UBR queue 440. Tokens supplied by the UBR queue 440 to the transmit controller 70 are recirculated back into the tail end of the UBR queue 440, until the VC associated with the token has no more data to send.

FIG. 5 depicts one embodiment of a schedule table which may be used in conjunction with the present rate control scheduler 15. In the depicted embodiment, the schedule table 455 is actually comprised of two identically-sized schedule sub-tables 500,505. A real-time sub-table 500 holds tokens for VCs having real-time qualities of service, while a non-real-time sub-table 505 holds tokens for non-real-time VCs. In the depicted embodiment, there can be up to four real-time tokens and four non-real-time tokens (i.e., eight total tokens) stored in each time window 510. Because, according to the present invention, the size of the data frame (to be transmitted by the transmit controller 70) which is represented by each token can vary, and because the time windows 510 are of a fixed (though configurable) length, a time window can be "oversubscribed." That is, the length of time it may take to transmit all of the data represented by the tokens in a particular time window 510 may be greater than the length of one time window 510.

The rate control scheduler 15 which utilizes the schedule table embodiment depicted in FIG. 5 maintains a service pointer for each sub-table, to determine the order in which tokens are read from the tables 500, 505 into the priority queue 465. The real-time and non-real-time service pointers operate in unison with the bin pointer (i.e., current time window pointer) until a lack of space in the priority queue 465 prevents the complete emptying of real-time and/or non-real-time tokens from a time window 510. This may happen (depending on the configured token capacity of the priority queue) if a time window is oversubscribed.

In such a case, one or both of the service pointers (as necessary) is allowed to lag behind the bin pointer to prevent overflowing the priority queue 465. Assuming the schedule table as a whole is not overbooked (i.e., assuming the total of the transmission time slices represented by the tokens in the schedule table does not exceed the length of the schedule table (which is the number of time windows times the time window length)), a service pointer(s) which lags behind the bin pointer will eventually "catch up" to (or realign with) the bin pointer on some subsequent time window, as the "backed-up" tokens are serviced during subsequent, "undersubscribed" time windows.

FIG. 5 also depicts the token format 530 for one embodiment of the present invention. In this embodiment, each token 530 is comprised of the VC number for the VC represented by the token and priority information. The priority information indicates the QOS for the VC.

As indicated above, a bitmap 405 is used in connection with the illustrated embodiment of the present rate control scheduler 15. The bitmap 405 enables location of a particular time window in very few steps. In this way, an upper bound is placed on the time it takes to locate the nearest available time window to the targeted time window for a particular token. Although the bitmap size (both in terms of the number of levels and the number of bits in each level) can be varied, each stage of the bitmap 405 is expected to be implemented in word lengths that are short enough to be easily decoded and which do not require much in the way of decoding logic.

Figure 6:
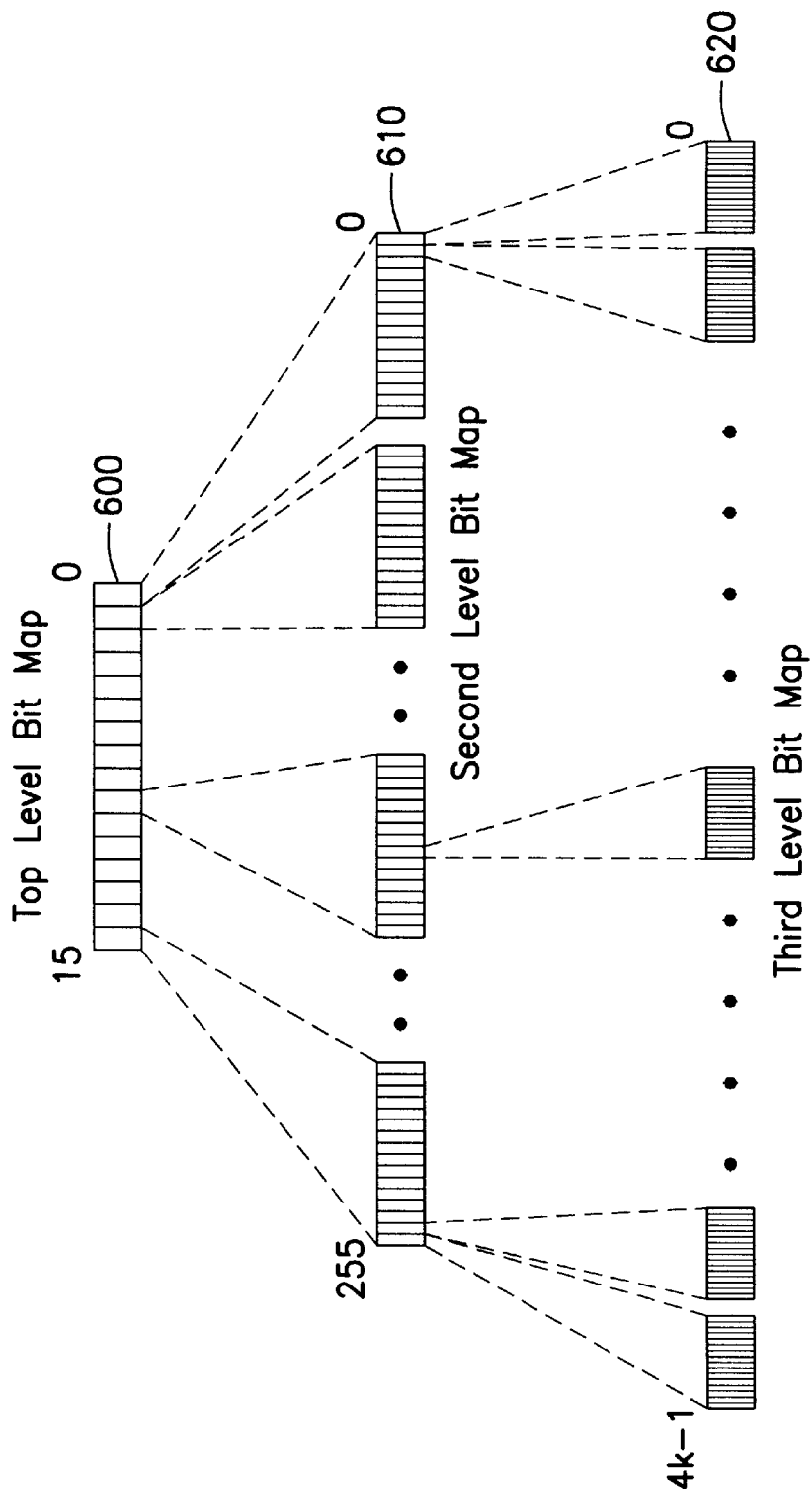
FIG. 6 depicts a three-level bitmap as employed in one embodiment of an adaptive rate control scheduler according to the present invention.

FIG. 6 depicts a three-level bitmap, with 16-bit word lengths, as employed in one embodiment of the present invention. In this embodiment, a first (or top) level bitmap 600 is used to locate (and determine vacancy in) the zone containing the targeted time window or a nearest alternative, a second level bitmap 610 is used to locate (and determine vacancy in) the sub-zone containing the targeted time window, and a third level bitmap 620 is used to locate (and determine vacancy in) the targeted time window. In the illustrated bitmap, the first level 600 contains 16 bits, the second level 610 contains 256 (16*16) bits, and the third level 620 contains 4K (16*16*16) bits.

Through the use of the three-level bitmap depicted in FIG. 6, a token can be placed in either its targeted time window, or, if that time window is unavailable, in the nearest alternative time window (which may, in some circumstances, be in a different sub-zone and/or zone than the targeted time window). When a particular time window is full, a corresponding bit in the third level 620 of the bitmap is set. When all the time windows in a particular sub-zone are filled, a corresponding bit in the second level 610 of the bitmap is set. When all the time windows in all the sub-zones in a zone are filled, a corresponding bit in the first level 600 of the bitmap is set.

The various levels of the bitmap are also updated as tokens are removed from the schedule table and transferred to the priority queue. If a token is removed from a filled time window, the bit corresponding to that time window in the third level 620 of the bitmap is cleared. Similarly, when a token is removed from a previously filled sub-zone or zone, the corresponding bit(s) in the first 600 and/or second 610 levels of the bitmap are cleared.

In the embodiment of the present invention which utilizes the schedule table depicted in FIG. 5, two bitmaps like that depicted in FIG. 6 are employed. One bitmap guides real-time tokens into the real-time schedule sub-table, and the other bitmap guides non-real-time tokens into the non-real-time schedule sub-table.

FIGS. 7A and 7B are flowcharts which, together, depict the token processing steps performed according to one embodiment of the present rate control scheduler. Token processing begins with the removal of a token from the priority queue or the VC activation queue (step 610). If the token was removed from the priority queue (which contains tokens for already active VCs) (step 615), the rate control scheduler checks the VC represented by the token to determine whether the VC has data to send (step 620). If the VC has no data to send, the VC is labeled inactive (within the per-VC context information stored, e.g., in the NIC's connection memory), and the token for that VC is removed from the scheduler (step 625). The rate control scheduler then reads a token from the schedule table to the priority queue (step 700; see discussion below of step 700 and subsequent steps).

If the VC represented by the token taken from the priority queue has data to send (step 620), then the next target time window for data transmission for that VC is calculated and stored in the context table (step 630). The next target time window is calculated by adding to the previous target time (stored in the context table) a nominal stride value (also stored in the context table), which is the desired time between consecutive data frame or cell transmissions for that VC.

An accumulated error value for the VC is calculated from the difference between the previous target time and the current time (i.e., the difference between the actual servicing time for the VC and its targeted service time, step 640). A gain value is then calculated from the accumulated error and a gain factor stored in the VC's context information (step 645). The value of the gain factor determines how much of the accumulated error is attempted to be compensated for during one pass of a VC token through the scheduler. The higher the gain factor, the faster the accumulated error is pushed toward zero, but also the greater the possible difference in spacing between adjacent cells or frames in the VC's data stream. A gain factor value of 1, for example, results in an attempt to reduce the entire accumulated error value for a particular VC to zero each time the VC's token cycles through the scheduler. Alternatively, a gain factor value of less than 1 results in only a fraction of the total accumulated error value for a VC being corrected for during any given scheduler cycle. In this way, the accumulated error value is more gradually pushed toward zero, and variations in the stride between data frames or cells for a particular VC are reduced.

If the token selected in step 610 was taken from the VC activation queue, rather than the priority queue (step 615), then the next target time for the token is calculated from the current time (as determined from the current bin pointer value) and the nominal stride value stored in the VC's context table entry (step 740).

Regardless of which queue the present token was selected from in step 610, a target time window offset for the token is generated by adding to the calculated target time the calculated gain value, and dividing the result by the time window length (step 650). The target time window offset represents the targeted time window for the current token. The current time window offset is generated by dividing the current time by the time window length (step 660). The current time window offset represents the time window currently being pointed to by the bin pointer. Both the current time window offset and the target time window offset have values which are offsets (in time windows) from the base of the schedule table.

Using the target time window offset value, the scheduler's bitmap is traversed to find the nearest available time window to the target time window (step 670). The token is then stored in this "nearest" time window (which will in most cases be the target time window). If the time window in which the token was stored no longer has any token vacancies (step 680), then the bitmap is updated to reflect the newly-filled time window, as well as, if appropriate, a newly-filled sub-zone, zone, etc. (step 690).

After processing a token in the above-described manner, the scheduler empties the tokens (or a portion thereof, depending on the priority queue's unfilled capacity) from the time window(s) pointed to by the real-time and non-real-time service pointers from the schedule table into the priority queue (step 700). If the time window(s) from which the tokens were emptied (in step 700) transitioned from full to not full due to removal of the token(s) therein (step 710), then the relevant bitmap (real-time or non-real-time) is updated, as appropriate, to reflect the newly-created vacancy(ies) in the time window(s), sub-zone(s), zone(s), etc. (step 720). The real-time and non-real-time service pointers are then updated, if appropriate, and the bin pointer incremented (step 730).

Figure 8:
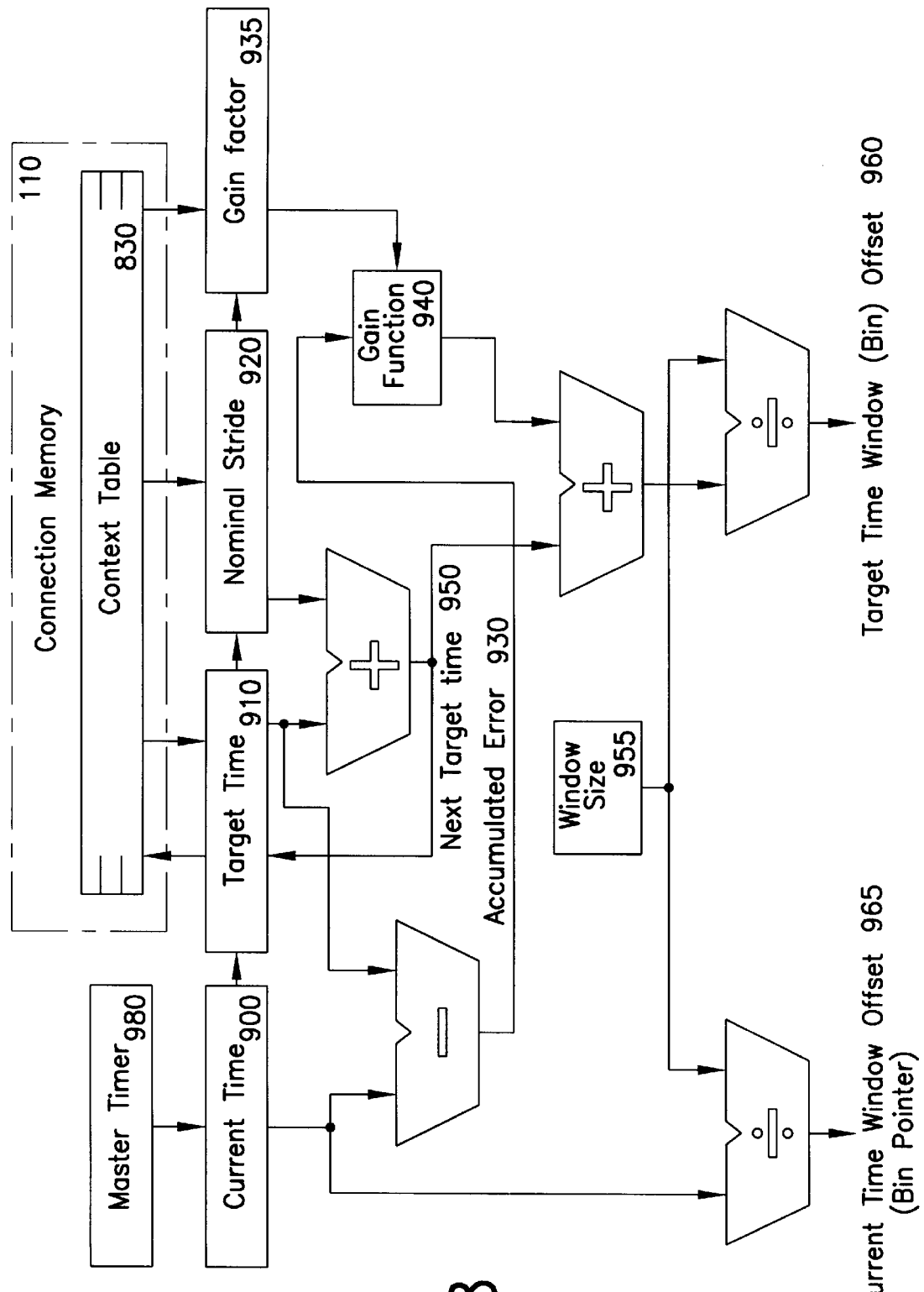
FIG. 8 depicts the logic employed in one embodiment of the present invention for calculating and compensating for an accumulated error value for each active rate controlled VC, and for generating current time window offset and target time window offset values.

As discussed above, error can be introduced into the various VC data streams by the scheduler. FIG. 8 depicts the logic employed in one embodiment of the present invention for calculating and compensating for the accumulated error value for each active rate controlled VC, and for generating the current time window offset and target time window offset values, as discussed above in conjunction with FIGS. 7A and 7B. The current time and target time values 900, 910, discussed above, are derived from a master timer 980, which is accurate to the tolerance of the system clock input to the NIC 40. The current time 900 is a snapshot of the master timer 980, taken each time a token is sent to the transmit controller 70 or, in the absence of token processing, each time the master timer crosses the boundary between one time window and the next. The target time 910 for a given VC is initialized to the current time 900 value when the token for the VC is read from the activation queue.

Figure 9A:
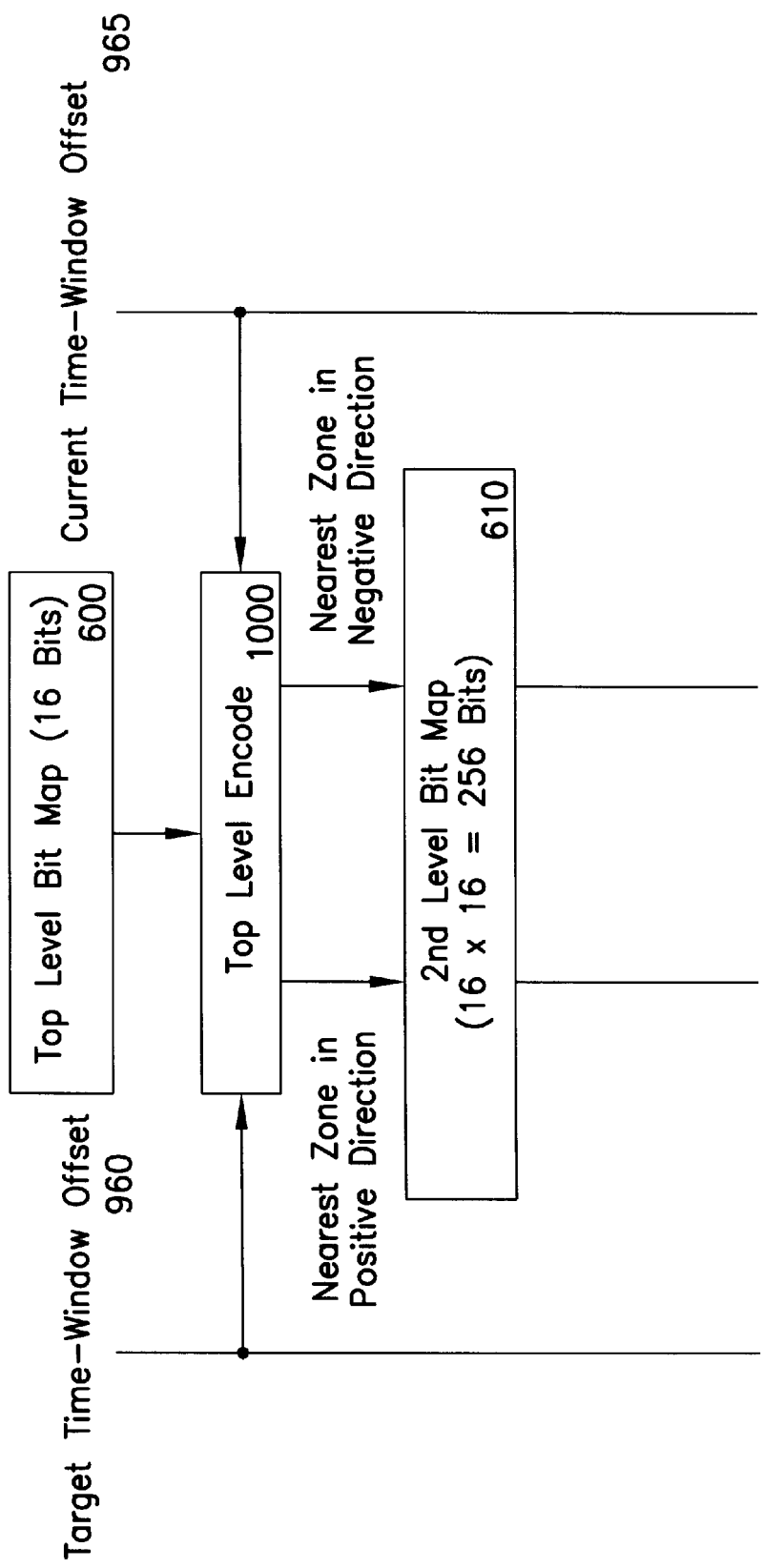
FIG. 9 depicts the logic used to locate the nearest available time slot to the target time window for a particular token in one embodiment of an adaptive rate control scheduler according to the present invention.
Figure 9B:
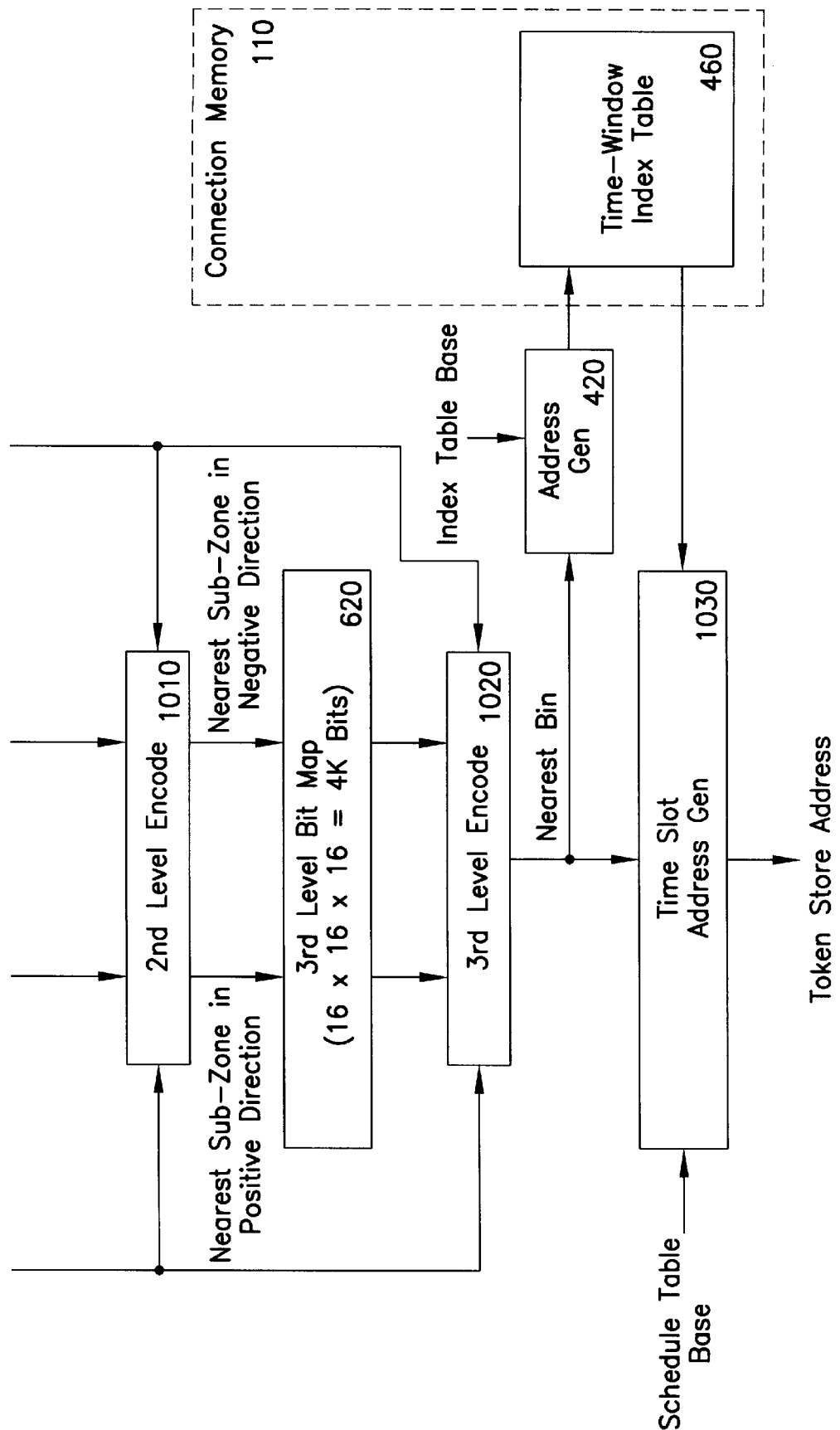

FIG. 9 depicts the logic used to locate the nearest available time window to the target time window for a particular token according to one embodiment of the present invention. The logic depicted in FIG. 9 utilizes a three-level bitmap, such as that depicted in FIG. 6. A top level encoder 1000 utilizes the top level 600 of the bitmap to find the two zones nearest the target time window. A second level encoder 1010 utilizes the second level 610 of the bitmap to find the two sub-zones nearest the target time window. A third level encoder 1020 utilizes the third level 620 of the bitmap to find the nearest available time window to the target time window. Once this "nearest available" time window (which will often be the target time window itself) is located, an associated index is located (through the use of an index address generator 420) and read from an index table 460 in connection memory 110, and then is used by a time slot address generator 1030 to generate the appropriate address in the schedule table for storage of the token. Using the logic of FIG. 9, a conflict resolution method is performed in a predetermined number of steps, in this case four (as indicated by blocks 1000, 1010, 1020, and 1030), to quickly locate an available time window that is near the calculated target time.

Figure 10:
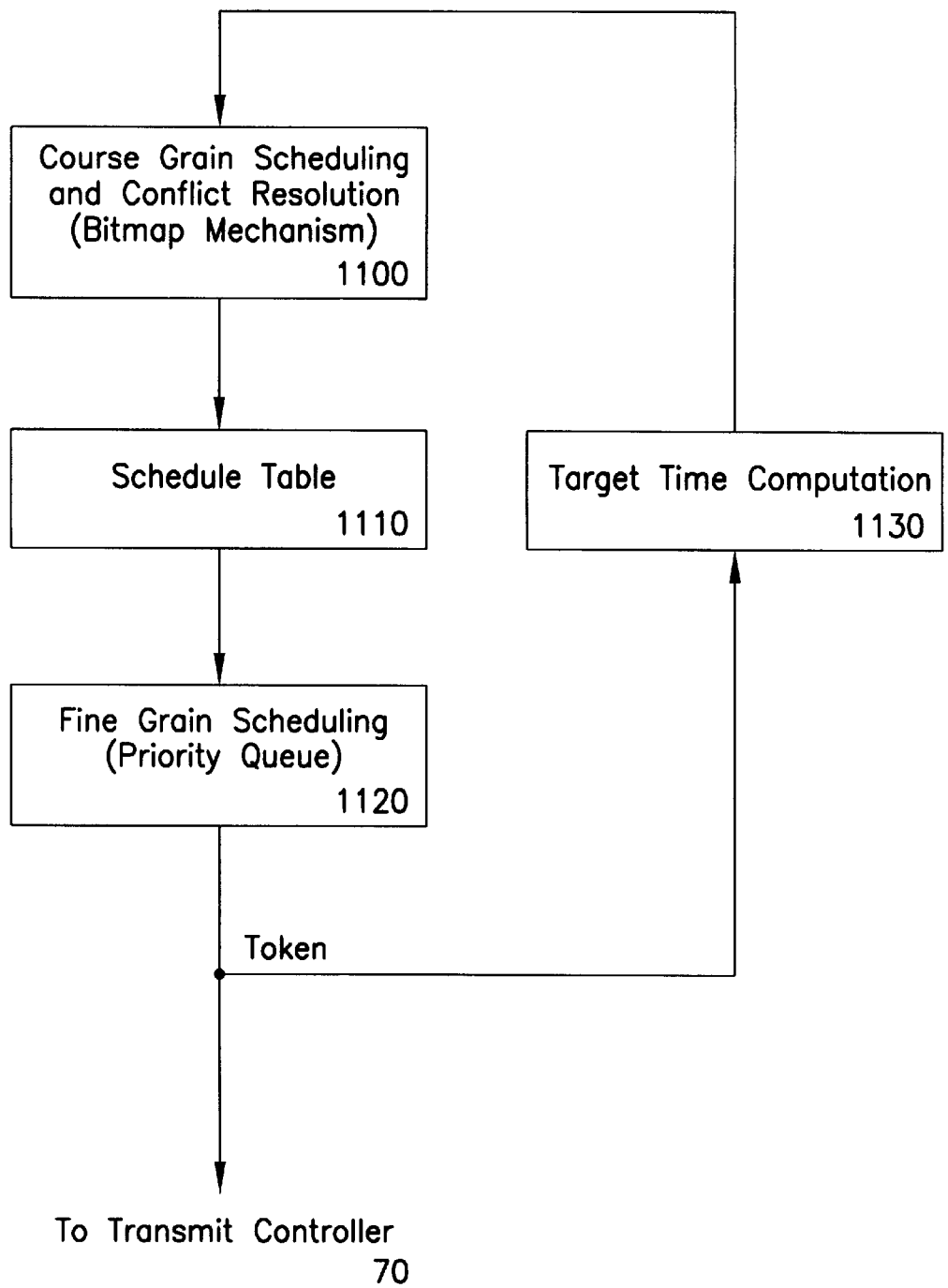
FIG. 10 depicts a functional block diagram of a rate control scheduler according to one embodiment of the present invention.

FIG. 10 depicts a functional block diagram of a rate control scheduler according to one embodiment of the present invention. As discussed above, in conjunction with FIGS. 1–9, handling of VC tokens by the illustrated rate control scheduler 15 involves performing a target time computation 1130 for the next data frame transmission for the VC, and performing coarse grain scheduling 1100 (through the use of a multi-level bitmap) to place the token into a schedule table 1110 in the nearest available time window to the targeted time. The token is subsequently read from the schedule table (in accordance with a service pointer which steps through the various schedule table time windows) and placed into a priority queue, which utilizes a prioritization scheme to perform fine grain scheduling 1120 of the token. When the token reaches the head of the priority queue, a copy of the token is sent to a transmit controller for servicing of the associated VC, and, if the VC remains active, the token processing cycle is begun again.

Figure 11:
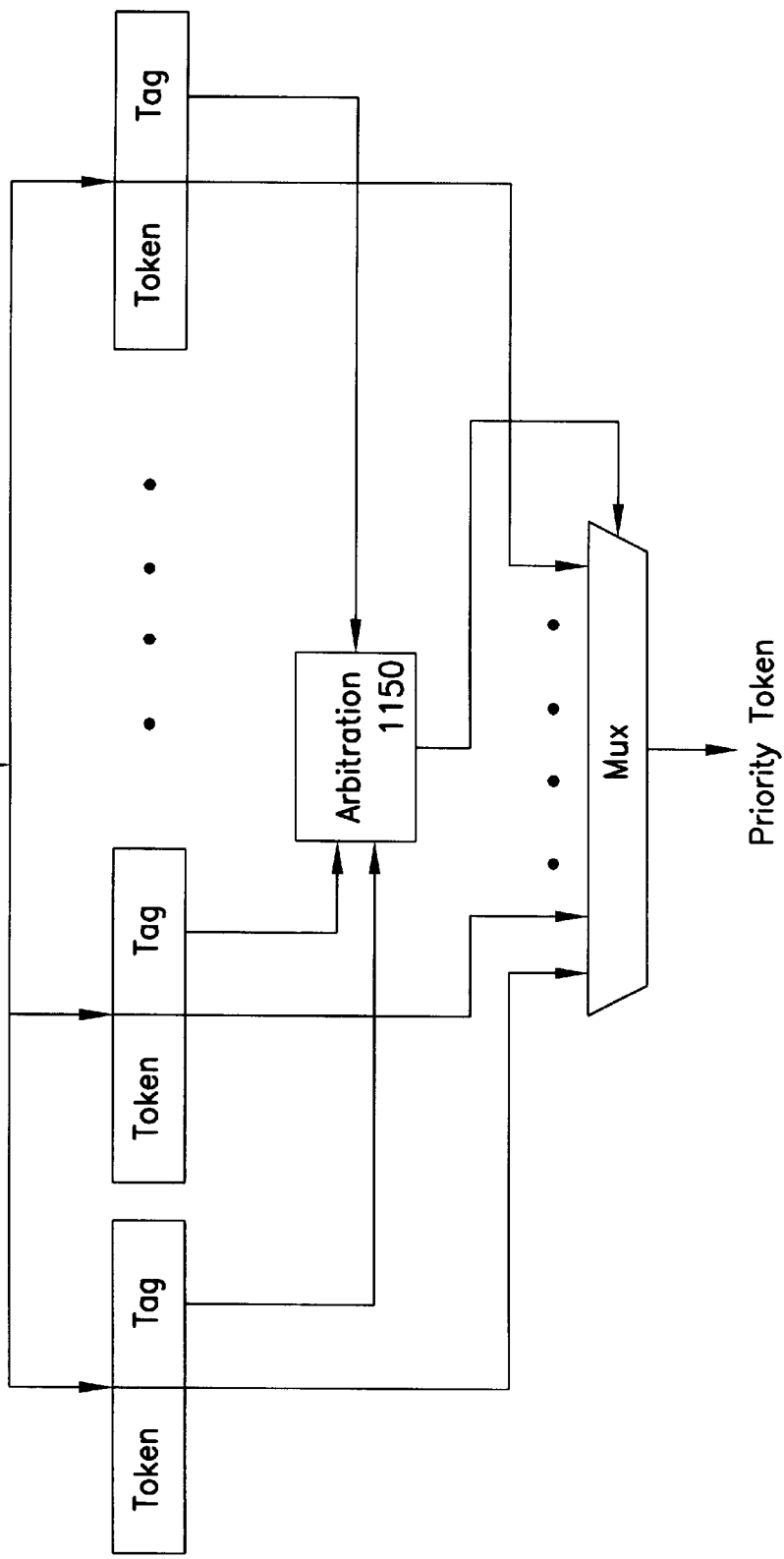
FIG. 11 depicts a functional block diagram of a priority queue according to one embodiment of the present invention.

FIG. 11 depicts a functional block diagram of a priority queue, according to one embodiment of the present invention. As discussed above, the priority queue holds the most recent tokens which have been emptied from the schedule table, and can be used to optimize the order in which they are issued to the transmit controller 70. The token capacity of the priority queue should be chosen, e.g., to be multiple times the token capacity of one schedule table time window, so that it can provide some elasticity for the scheduler in potential instances of time window overbooking.

When a particular token is read from the schedule table, according to the embodiment of the present invention depicted in FIG. 11, the token is tagged with its relative priority and the relative position of its target time to the current time, using a tag function 1140, and written to the priority queue. Once in the priority queue, the relative priority information in each of the various tags is continually updated, as tokens are added to and removed from the priority queue. The priority queue uses the tags to prioritize, via an arbitration mechanism 1150, between the tokens in the priority queue, to determine the token to be next sent to the transmit controller for servicing.

Figure 12:
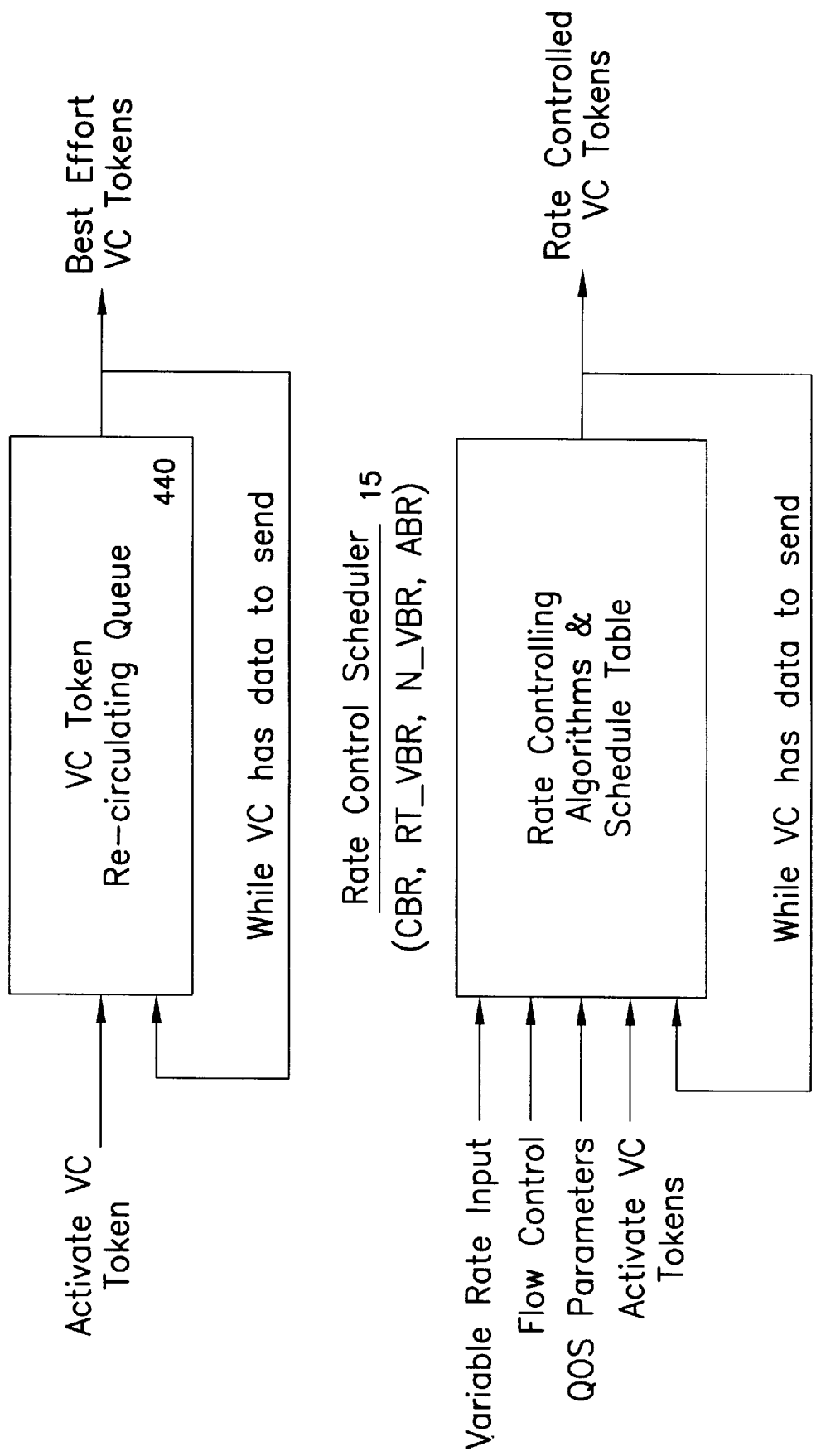
FIG. 12 depicts block diagrams of a rate control scheduler and a UBR scheduler according to one embodiment of the present invention.

FIG. 12 depicts block diagrams of a rate control scheduler 15 and a best effort scheduler 1200 according to one embodiment of the present invention. As discussed above, each of the depicted schedulers processes tokens and supplies them to the transmit controller 70 for servicing of the VCs associated with the tokens.

Although various embodiments are specifically illustrated and described herein, it will be appreciated that modifications and variations of the present invention are covered by the above teachings and within the purview of the appended claims without departing from the spirit and intended scope of the invention.

What is claimed is:

1. A rate controlled scheduling method in a network node having a transmit controller, a schedule table having a plurality of time windows, each time window including at least one token slot and a priority queue containing at least one token, where each token represents an active virtual circuit (VC), the method comprising the steps of:

(A) selecting a first token from the priority queue;

(B) sending a copy of the first token to the transmit controller for servicing of the VC represented by the first token;

(C) calculating a next target time for servicing of the VC represented by the first token;

(D) storing the first token in the schedule table in a time window near the calculated next target time, said time window representing a time period during which a token is expected to be processed; and (E) processing subsequent tokens from the schedule table by transferring said tokens to the priority queue.

2. The method according to claim 1, wherein the node further includes a bitmap having a plurality of bits, each bit having one of a "set" state or a "cleared" state, and wherein a "set" state indicates one or more filled time windows and a "cleared" state indicates one or more unfilled time windows, and wherein the storing step includes traversing the bitmap to find the unfilled time window nearest the calculated next target time.

3. The method according to claim 1, wherein the virtual circuit represented by the first token has an associated previous target time value and a nominal stride value, and wherein the next target time is calculated using the previous target time value and the nominal stride value.

4. The method according to claim 3, wherein the schedule table has an associated current time value and the virtual circuit represented by the first token also has an associated gain value, and wherein an offset to the next target time window in the schedule table is calculated using the current time value, the previous target time value, the nominal stride value, and the gain value.

5. The method according to claim 3, wherein the schedule table has a selectable time window size and a current time value and the virtual circuit represented by the first token also has an associated gain value, and wherein an offset to the next target time window in the schedule table is calculated using the previous target time value, the nominal stride value, the gain value, and the time window size value.

6. The method of claim 4, wherein the schedule table also has a selectable time window size, and wherein an offset to the next target time window in the schedule table is calculated using the current time value, the previous target time value, the nominal stride value, the gain value, and the time window size value.

7. An apparatus for scheduling tokens representing active virtual circuits and for supplying the tokens to a transmit controller, the apparatus comprising:

(A) a schedule table having a plurality of time windows in which tokens can be stored;

(B) a target time computation mechanism for generating an offset to a target time window in said schedule table, said target time window containing a token slot that is the target for storing a first token;

(C) a coarse grain scheduling mechanism coupled between the target time computation mechanism and the schedule table for determining an available time window in the schedule table near the target time window, said time window representing a time period during which a token is expected to be processed; and (D) a priority queue coupled to the schedule table for buffering tokens from the schedule table and supplying the buffered tokens to the transmit controller.

8. The apparatus of claim 7, wherein the coarse grain scheduling mechanism is comprised of a bitmap.

9. The apparatus of claim 8, wherein the bitmap is comprised of a plurality of bits, each bit having one of a "set" state or a "cleared" state, and wherein a "set" state indicates one or more filled time windows and a "cleared" state indicates one or more unfilled time windows.

10. The apparatus of claim 7, wherein the priority queue employs a prioritization scheme to arbitrate among the tokens.

11. The apparatus of claim 7, wherein the tokens include rate controlled tokens and non-rate controlled tokens and wherein the first token is a rate controlled token, further comprising a recirculating sequential queue having a plurality of non-rate controlled tokens, coupled to the transmit controller, for supplying the non-rate controlled tokens to the transmit controller.

12. The apparatus of claim 7, wherein the tokens include real-time tokens and non-real-time tokens, and wherein the schedule table is comprised of a real-time schedule table for storing real-time tokens and a non-real-time-schedule table for storing non-real-time tokens.

13. A scheduling method in a network node having a transmit controller, a schedule table having a plurality of time windows, each time window including at least one token slot and a priority queue containing at least one token, where each token represents an active virtual circuit (VC), the method comprising the steps of:

(A) selecting a first token from the priority queue;

(B) calculating a next target time for servicing of the VC represented by the first token in a transmit controller;

(C) performing conflict resolution in a predetermined set of steps;

(D) storing the first token in the schedule table in a time window near the calculated next target time, said time window representing a time period during which a token is expected to be processed; and (E) processing said first token by transferring said first token to said priority queue.

14. The method according to claim 13, wherein the node further includes a bitmap having a plurality of bits, each bit having one of a "set" state or a "cleared" state, and wherein a "set" state indicates one or more filled time windows and a "cleared" state indicates one or more unfilled time windows, and wherein the storing step includes traversing the bitmap to find the unfilled time window nearest the calculated next target time.

15. The method according to claim 13, wherein the virtual circuit represented by the first token has an associated previous target time value and a nominal stride value, and wherein the next target time is calculated using the previous target time value and the nominal stride value.

16. The method according to claim 15, wherein the schedule table has an associated current time value and the virtual circuit represented by the first token also has an associated gain value, and wherein an offset to the next target time window in the schedule table is calculated using the current time value, the previous target time value, the nominal stride value, and the gain value.

17. The method according to claim 15, wherein the schedule table has a selectable time window size and a current time value and the virtual circuit represented by the first token also has an associated gain value, and wherein an offset to the next target time window in the schedule table is calculated using the previous target time value, the nominal stride value, the gain value, and the time window size value.

18. The method of claim 16, wherein the schedule table also has a selectable time window size, and wherein an offset to the next target time window in the schedule table is calculated using the current time value, the previous target time value, the nominal stride value, the gain value, and the time window size value.

19. An apparatus for scheduling tokens representing active virtual circuits and for supplying the tokens to a transmit controller, the apparatus comprising:

(A) a schedule table having a plurality of time windows in which tokens can be stored, each token representing a data frame having a variable size;

(B) a target time computation mechanism for generating an offset to a target time window in said schedule table, said time window representing a time period during which a token is expected to be processed; and (C) a priority queue coupled to the schedule table for buffering tokens from the schedule table and supplying the buffered tokens to the transmit controller.

20. The apparatus of claim 19 wherein said target time computation mechanism is a rate control scheduler, said rate control scheduler maintaining a bin pointer and a service pointer where said bin pointer addresses a current time window of said schedule table for supplying buffered tokens in said current time window to the transmit controller and said service pointer addresses one of said tokens in said schedule table to be supplied to the transmit controller.

21. The apparatus of claim 20 wherein said service pointer is capable of lagging behind said bin pointer such that said service pointer addresses one of said tokens in one of said time windows other than the current time window addressed by said bin pointer.

22. The apparatus of claim 21 wherein said target time window contains a token that is the target for storing a first token, the apparatus further comprising:

(D) a coarse grain scheduling mechanism coupled between the target time computation mechanism and the schedule table for determining an available time window in the schedule table near the target time window.

23. The apparatus of claim 22, wherein the coarse grain scheduling mechanism is comprised of a bitmap.

24. The apparatus of claim 23, wherein the bitmap is comprised of a plurality of bits, each bit having one of a "set" state or a "cleared" state, and wherein a "set" state indicates one or more filled time windows and a "cleared" state indicates one or more unfilled time windows.

25. The apparatus of claim 22, wherein the priority queue employs a prioritization scheme to arbitrate among the tokens.

26. The apparatus of claim 22, wherein the tokens include rate controlled tokens and non-rate controlled tokens and wherein the first token is a rate controlled token, further comprising a recirculating sequential queue having a plurality of non-rate controlled tokens, coupled to the transmit controller, for supplying the non-rate controlled tokens to the transmit controller.

27. The apparatus of claim 22, wherein the tokens include real-time tokens and non-real-time tokens, and wherein the schedule table is comprised of a real-time schedule table for storing real-time tokens and a non-real-time-schedule table for storing non-real-time tokens.

* * * * *